(12) United States Patent
Partsch et al.

(10) Patent No.: US 8,807,637 B2
(45) Date of Patent: Aug. 19, 2014

(54) ANGLED FRONT HOOD SEALING ASSEMBLY

(71) Applicant: Tesla Motors, Inc., Palo Alto, CA (US)

(72) Inventors: Matthew R. Partsch, Livonia, MI (US); Benjamin Roger Zabik, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/621,943

(22) Filed: Sep. 18, 2012

(65) Prior Publication Data

US 2013/0076076 A1  Mar. 28, 2013

Related U.S. Application Data

(60) Provisional application No. 61/539,860, filed on Sep. 27, 2011.

(51) Int. Cl.
*B62D 25/12* (2006.01)
*F16J 15/06* (2006.01)
*B60J 10/00* (2006.01)

(52) U.S. Cl.
CPC .......... *B60J 10/0014* (2013.01); *B60J 10/0065* (2013.01); *B60J 10/0031* (2013.01)
USPC .................................................. 296/193.11

(58) Field of Classification Search
CPC .... B62D 25/081; B62D 25/08; B62D 25/084; B62D 25/163; B62D 21/20; B62D 33/04; B62D 53/061; B62D 63/06; B60J 10/0031; B60J 10/0065; B60J 10/0014; B27K 3/08; B27K 3/105; B60K 11/04; B65D 47/30; B65D 81/363; B01D 39/163; B01D 46/0002; B01D 46/0005; B01D 46/10; B29C 45/00; B29C 53/00; B60D 1/40; B65F 1/16; B65F 2250/111; B65F 2250/112; B65F 2250/114
USPC .......... 428/36.91, 36.9, 122; 49/490.1, 498.1; 180/69.21, 274; 296/193.1, 19.11, 206, 296/207, 146.9
See application file for complete search history.

(56) References Cited

U.S. PATENT DOCUMENTS

| | | | | |
|---|---|---|---|---|
| 5,149,169 | A | * | 9/1992 | Nozaki ................... 296/206 |
| 5,154,952 | A | * | 10/1992 | Nozaki ..................... 428/37 |
| 5,449,544 | A | * | 9/1995 | Ogawa et al. ............ 428/122 |
| 5,715,632 | A | * | 2/1998 | Nozaki ................... 49/475.1 |

(Continued)

*Primary Examiner* — Glenn Dayoan
*Assistant Examiner* — Sunsurraye Westbrook
(74) *Attorney, Agent, or Firm* — J. Richard Soderberg

(57) ABSTRACT

A seal assembly for use with the front trunk, motor or engine compartment of an automobile is provided, the seal assembly including a sealing flange, a sealing member attached to an end portion of the sealing flange, and a hood assembly that includes an upper panel and an inner surface comprised of a sealing surface. The sealing surface of the hood assembly is configured to form a seal with the sealing member when the hood assembly is in a closed position. The sealing surface of the hood assembly is spaced apart from the end portion of the sealing flange, thereby allowing the sealing surface to pass by the end portion of the sealing flange when a downward force, such as that experienced during a head-on collision with a pedestrian, is applied to the hood causing the hood assembly to be downwardly displaced past the closed position.

20 Claims, 4 Drawing Sheets

(56) References Cited

U.S. PATENT DOCUMENTS

| | | |
|---|---|---|
| 5,988,305 A | 11/1999 | Sakai et al. |
| 6,189,951 B1 * | 2/2001 | Deguchi .................. 296/146.9 |
| 6,637,810 B2 * | 10/2003 | Kisiler et al. ................. 296/206 |
| 6,749,254 B1 * | 6/2004 | Kleven et al. ................. 296/191 |
| 7,303,040 B2 | 12/2007 | Green et al. |
| 7,828,100 B2 | 11/2010 | Polz et al. |
| 8,118,352 B2 | 2/2012 | Rocheblave et al. |
| 2010/0045070 A1 * | 2/2010 | Rocheblave et al. .... 296/187.04 |

* cited by examiner

ANGLED FRONT HOOD SEALING ASSEMBLY

CROSS-REFERENCE TO RELATED APPLICATION

This application claims the benefit of the filing date of U.S. Provisional Patent Application Ser. No. 61/539,860, filed 27 Sep. 2011, the disclosure of which is incorporated herein by reference for any and all purposes.

FIELD OF THE INVENTION

The present invention relates generally to vehicles and, more particularly, to an improved sealing flange for a vehicle hood assembly.

BACKGROUND OF THE INVENTION

Vehicles use a variety of structures to protect the vehicle's occupants during a crash as well as minimize vehicle damage and simplify post-crash repairs. In general, these structures control how crash energy is transmitted through the vehicle and, more particularly, how crash energy is transmitted into the passenger compartment. Additional structures, such as seat belts, head restraints and air bags, are used to restrain passenger movement during a crash, thereby preventing the passengers from hurting themselves as their bodies react to the crash forces.

In recent times, efforts have also been made to provide protection for pedestrians that are in proximity to a moving vehicle. For example, a variety of techniques are now in use that limit the risk of a vehicle backing up and hitting a pedestrian. These techniques may utilize a pedestrian warning system such as an audible and distinct sound that is emitted by the vehicle when it is in reverse (e.g., a continuous series of beeps), thus helping pedestrians to recognize and react to an approaching vehicle. Alternately, some techniques are designed to provide additional warnings to the driver of the reversing vehicle, these techniques proving especially useful for eliminating driver blind spots. Such techniques may use proximity sensors that warn the driver, or automatically engage the brakes, when the reversing vehicle is about to collide with someone or something. Rear view cameras are another often used safety feature that provides the driver with an alternate view of their rearward surroundings whenever the car is in reverse.

In addition to attempting to minimize pedestrian accidents that occur when a car is backing up, recent advances in vehicle safety include design features that are intended to minimize the severity of accidents involving pedestrians hit by the front of the vehicle, i.e., head-on collisions with the vehicle. Typically at high speeds, a pedestrian involved in such a collision is thrown over or to the side of the on-coming vehicle. At lower speeds, however, the pedestrian tends to crumple over the front of the car, thereby causing the pedestrian's head to impact the vehicle's hood. Even at low speeds such accidents are often fatal.

A variety of different approaches have been investigated that are designed to minimize the impact force in a pedestrian/vehicle accident. For example, U.S. Pat. No. 7,303,040 discloses an active hood system that is designed to minimize impact force by moving the vehicle hood into an elevated position within 15 to 30 milliseconds of the detection of a collision or an accident between a pedestrian and the vehicle. By elevating the hood, the distance between the hood and the pedestrian is lessened, resulting in a lower impact force. In one of the disclosed embodiments, the hood is elevated in stages, with the last stage of movement being dampened.

U.S. Pat. No. 5,988,305 discloses an alternate method of minimizing the severity of head impact injuries in pedestrian/vehicle accidents, the disclosed approach utilizing a hood panel that is designed to absorb impact energy at an ideal rate. A variety of hood panel designs are disclosed, each of which includes an outer panel and an absorber mounted beneath the panel that is designed to absorb the impact energy during panel deformation.

U.S. Pat. No. 8,118,352 discloses a hood liner that stiffens the hood along its periphery. Within the liner is a hollow portion with a weakened bottom or side wall. During impact the weakened wall breaks, allowing deflection of the hood and reduced impact force.

While a variety of structures have been designed that are intended to lessen the severity of injuries that result from pedestrian/vehicle accidents, these techniques tend to be relatively complex, thus increasing manufacturing costs. Additionally these structures are not designed to provide a water tight seal between the hood and the underlying compartment. Accordingly, what is needed is a simple technique for reducing head impact force during a pedestrian/vehicle collision, while achieving a water tight seal. The present invention provides such a structure.

SUMMARY OF THE INVENTION

A seal assembly for use with the front trunk, motor or engine compartment of an automobile is provided, the seal assembly including a sealing flange coupled to a vehicle structure, a sealing member attached to an end portion of the sealing flange, and a hood assembly that includes an upper panel and an inner surface comprised of a sealing surface. The sealing surface of the hood assembly is configured to form a seal with the sealing member when the hood assembly is in a closed position. The sealing surface of the hood assembly is spaced apart from the end portion of the sealing flange, thereby allowing the sealing surface to pass by the end portion of the sealing flange when a downward force, such as that experienced during a head-on collision with a pedestrian, is applied to the hood causing the hood assembly to be downwardly displaced past the closed position. A portion of the sealing surface may be angled at an angle of between 75 and 105 degrees as measured from the upper panel of the hood assembly.

The sealing member, preferably fabricated from an elastomeric material such as natural rubber or a synthetic rubber (e.g., nitrile, nitrile butadiene, carborylated nitrile, hydrogenated nitrile, perfluoroelastomer, silicone, silicone elastomer blends, thermoplastic elastomers, fluorosilicone, neoprene, ethylene propylene, polyurethane, butyl and ethylene propylene diene monomer), is partially compressed and deformed by the sealing surface when the hood assembly is closed. When a downward force is applied on the hood, the sealing member may undergo additional compression and deformation as the sealing surface passes the end portion of the sealing flange.

The sealing flange may be angled at an angle $\theta$, as measured from the horizontal plane, where $\theta$ is preferably in the range of 20 to 70 degrees, more preferably in the range of 35 to 55 degrees, and still more preferably set at approximately 45 degrees.

The sealing member may include a slot configured to capture the end portion of the sealing flange. The slot may include a plurality of pliable fingers, preferably angled relative to the inner slot surface, configured to hold the sealing member in place on the end portion of the sealing flange. An adhesive may be used to hold the sealing member in place on the end portion of the sealing flange.

The inner surface of the hood assembly, which may be fabricated from plastic, is preferably spaced apart from the upper panel of the hood assembly, which may be fabricated from metal. The region between the inner surface and the upper panel of the hood assembly may be filled with a compressible material, such as foam. A portion of the inner surface may be recessed, the recessed portion located in a position that is complementary to the end portion of the sealing flange.

A further understanding of the nature and advantages of the present invention may be realized by reference to the remaining portions of the specification and the drawings.

DESCRIPTION OF THE SPECIFIC EMBODIMENTS

Figure 1:
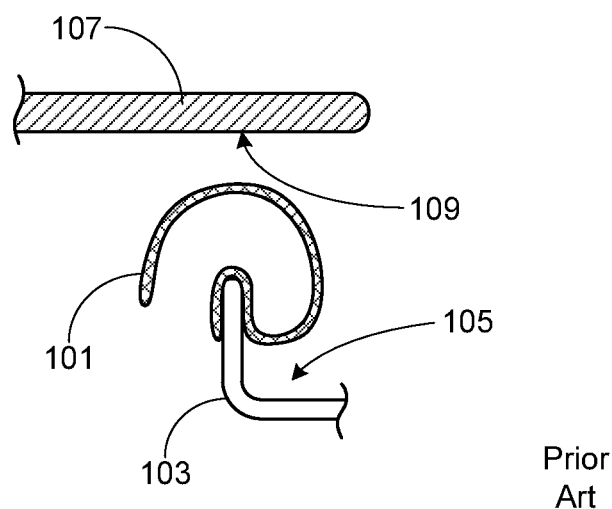
FIG. 1 provides a cross-sectional view of an uncompressed seal in accordance with the prior art.
Figure 2:
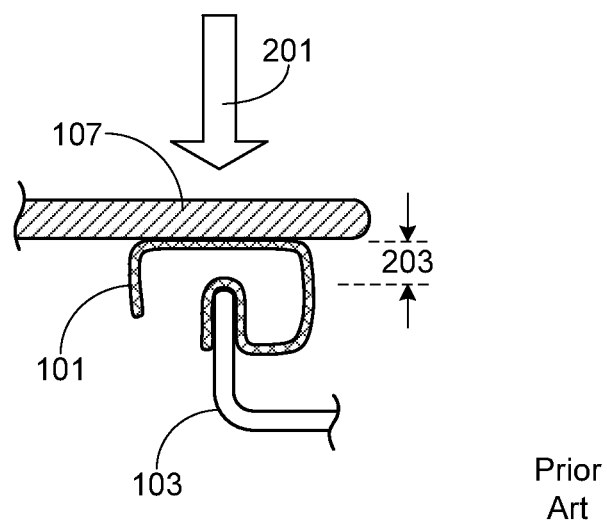
FIG. 2 provides an alternate view of the seal shown in FIG. 1 in which the seal is compressed by a hood member.

FIGS. 1 and 2 illustrate a conventional hood seal 101 in accordance with the prior art. Seal 101, fabricated from an elastomeric material, is fitted to a metal flange 103. Seal 101 may be bonded to flange 103, friction fit to flange 103, or use a combination of both fit and adhesive to hold it in place. Flange 103, which may be configured as an extension of a vehicle structural member or a body member (e.g., fender, cowling, etc.), typically forms part of a rigid gutter assembly 105 that provides a pathway for water to escape the compartment (e.g., trunk, engine compartment, etc.) sealed by sealing member 101.

As shown in FIG. 1, when hood panel 107 is in an open or semi-open position, seal 101 is uncompressed. When hood panel 107 is closed, as shown in FIG. 2, seal 101 is compressed, thereby forming an effective seal with a sealing surface 109 of hood panel 107. Unfortunately with this design, when a downward force 201 is applied, for example due to a collision with a pedestrian, hood panel 107 may only be compressed by a small amount 203, on the order of a few millimeters, before the sealing surface comes into contact with the underlying rigid flange 103. As a result, the impact energy imparted by the pedestrian is not absorbed, or absorbed by only a minimal amount, leading to significant pedestrian injuries.

Figure 3:
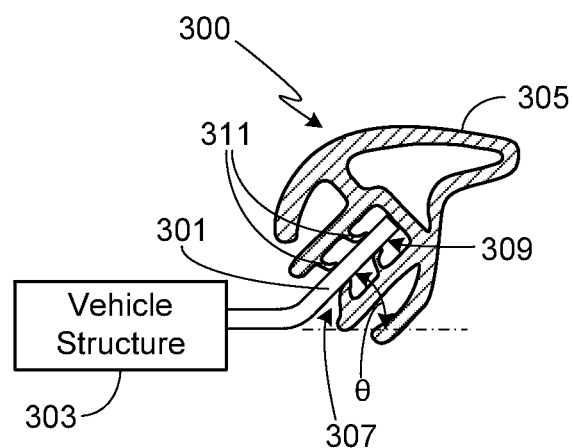
FIG. 3 provides a cross-sectional view of an uncompressed sealing assembly in accordance with the invention.

FIG. 3 provides a cross-sectional view of an alternate sealing assembly 300 configured in accordance with the invention. As shown, in this configuration flange 301 extends away from a vehicle structure 303 at an angle θ. Flange 301 may be fabricated from any of a variety of materials including composites and metal. Angle θ is preferably in the range of 20 to 70 degrees as measured from the horizontal, more preferably in the range of 35 to 55 degrees as measured from the horizontal, and still more preferably at an angle of approximately 45 degrees from the horizontal. Flange 301 may be formed as an extension of a vehicle structural member or a body member, as in a conventional vehicle, or as a separate member.

Attached to flange 301 is a seal 305, also referred to herein as a sealing member. In order to achieve the desired seal, preferably sealing member 305 is fabricated from a pliable, elastomeric material that is water resistant, and more preferably waterproof. Seal 305, or at least the outer surface of seal 305, is preferably non-porous, thus preventing water from being captured within the material. Exemplary materials for seal 305 include both natural and synthetic rubbers (e.g., nitrile, nitrile butadiene, carborylated nitrile, hydrogenated nitrile, perfluoroelastomer, silicone, silicone elastomer blends (SEBs), thermoplastic elastomers (TPEs), fluorosilicone, neoprene, ethylene propylene, polyurethane, butyl, etc.). In the preferred embodiment seal 305 is fabricated from ethylene propylene diene monomer (EPDM) rubber.

Figure 4:
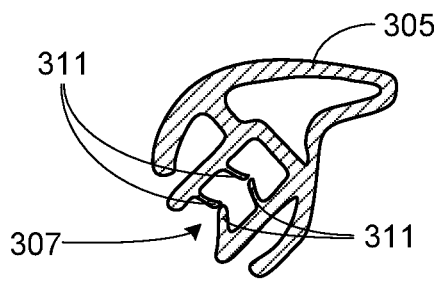
FIG. 4 provides a similar view of the seal shown in FIG. 3 except that the seal is shown un-mounted.

In the preferred and illustrated embodiment, seal 305 includes a slot 307 configured to fit over an end portion 309 of flange 301. The inner surface of slot 307 includes a plurality of ribs 311, also referred to herein as pliable fingers, designed to deflect during application of the seal to the sealing flange. FIG. 4 shows a cross-sectional view of seal 305 prior to assembly with the sealing flange, this view showing ribs 311 in their non-deflected state. Although fingers 311 may be normal, or substantially normal, to the inner surfaces of slot 307, preferably they are angled, for example as shown in FIG. 4. Preferably the angle of the non-deflected fingers 311 is within the range of 10 to 70 degrees as measured from the normal to the inner slot surface. Angling fingers 311, for example as shown, aids during insertion of flange 301 into slot 307, while resisting the accidental removal of the seal from the sealing flange. Additionally, by angling fingers 311 in the illustrated direction, they tend to fold in a much more controlled fashion during assembly. It will be appreciated that an adhesive may also be used, alone or in combination with the ribbed structure, to attach seal 305 to flange 301.

Figure 5:
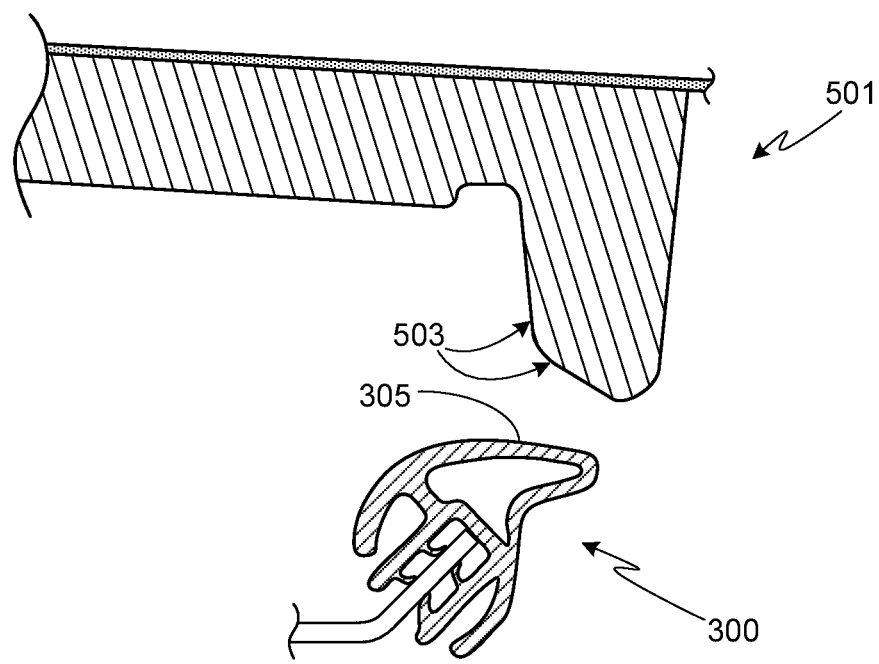
FIG. 5 provides a similar view of the seal shown in FIG. 3, with the hood assembly shown in a partially open position.
Figure 6:
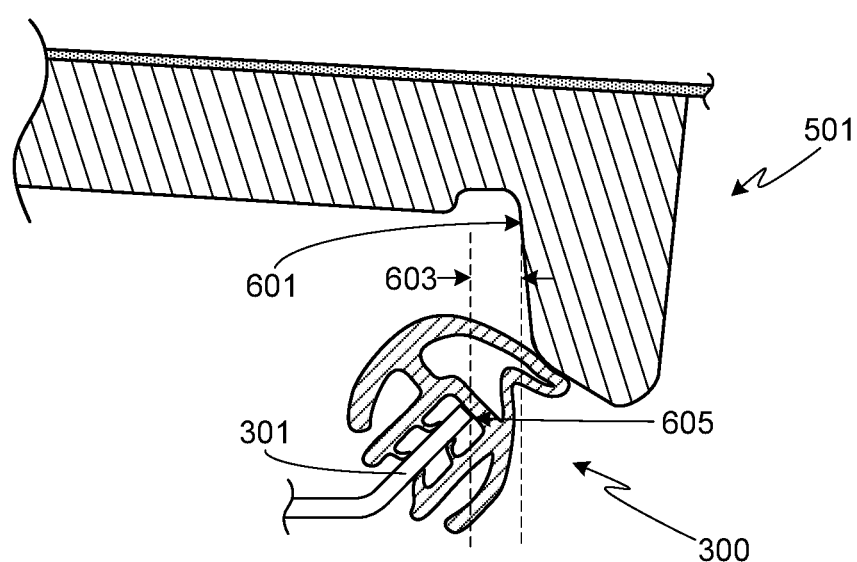
FIG. 6 provides a similar view of the seal/hood assembly shown in FIG. 5, with the hood assembly shown in the normal closed position.
Figure 7:
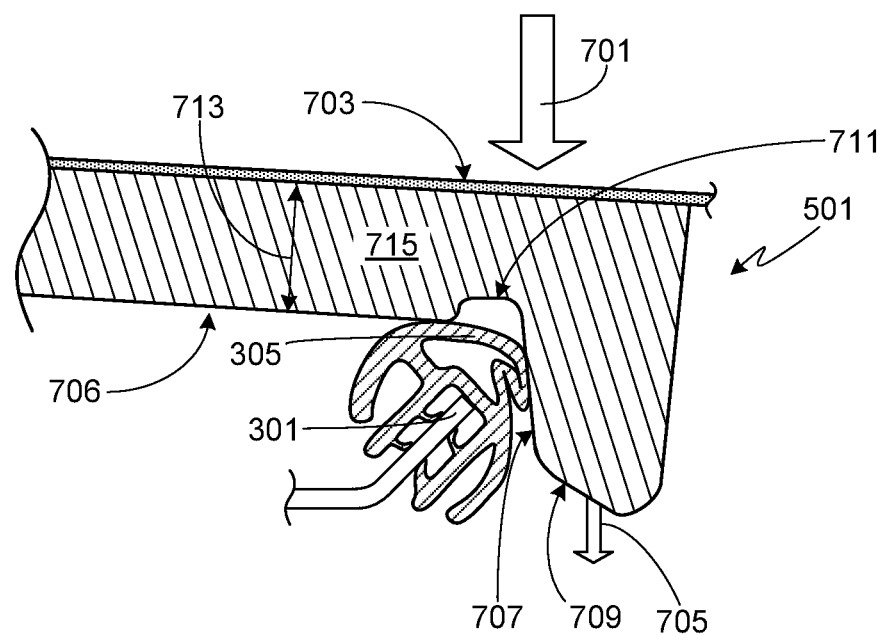
FIG. 7 provides a similar view of the seal/hood assembly shown in FIGS. 5 and 6, with the hood assembly in the abnormal displaced position.

FIGS. 5-7 illustrate the use of seal 305, and more specifically, the use of seal 305 with a vehicle hood structure 501. It should be understood that seal assembly 300 may be used in other applications requiring a water tight seal. The primary application, however, is with a vehicle's front compartment (e.g., engine compartment, front storage compartment), thus achieving the desired sealing qualities while also providing a structure that allows a large downward displacement of the hood from the normal closed position during a collision, e.g., a head-on collision with a pedestrian.

In FIG. 5, the hood assembly 501 is shown in a partially open position. In this position the sealing surface 503 of assembly 501 is not in contact with seal 305. FIG. 6 illustrates the normal, closed position of hood assembly 501. In this position the inner hood assembly sealing surface 503 causes a slight compression of seal 305, sufficient to yield a water tight seal. Note that due to the design of the seal and the complementary sealing surface, and as illustrated in FIG. 6, the edge 601 of sealing surface 503 is horizontally displaced by a distance 603 from the end surface 605 of flange 301. As a result of this displacement and the elastic qualities of seal 305, when a downward force 701, such as that encountered during a head-on collision with a pedestrian, is applied to the outer surface 703 of hood assembly 501, the sealing surface 503 is able to easily pass by the sealing flange 301 as shown in FIG. 7. Note that in FIG. 7 the hood assembly 501 may be even further downwardly displaced before seal 305 is completely compressed and inner surface 503 is prevented from further downward motion by sealing flange 301. In the preferred embodiment, sealing surface 503, and therefore hood assembly 501, is able to be displaced by up to 25 millimeters along direction 705. It should be understood, however, that the disclosed seal design may be used to obtain displacement distances of greater than 25 millimeters. As a result of the disclosed seal configuration, the impact force imparted to the pedestrian is reduced over that associated with a conventional sealing system.

In the preferred and illustrated embodiment, hood assembly 501 includes an inner surface that is separate from, and preferably displaced from, outer panel 703. As shown, preferably this inner hood surface includes a first portion 706 that is substantially parallel with outer hood panel 703, and a second portion comprised of the sealing surface 503. Sealing surface 503 includes a substantially vertical portion 707 that is designed to slide past the sealing assembly 300 during a collision. Portion 707 of sealing surface 503 may also form a portion of the seal with sealing member 305. Preferably portion 707 is substantially perpendicular, i.e., between 75 and 105 degrees, to outer hood panel 703. Sealing surface 503 also includes an angular sealing surface 709 that provides the primary sealing surface for use with sealing member 305 during normal usage. Additionally, in the preferred embodiment the inner hood surface includes a notched region 711 that is in a complementary position relative to the end portion 605 of sealing flange 301. Notched region 711 allows further vertical displacement of the hood assembly during a collision.

While the various structures comprising the hood assembly may be fabricated from the same material (e.g., metal, composite, etc.), in the preferred embodiment the inner hood surface, including both sealing surface 503 and non-sealing surface 706, is fabricated from a different material than that of the outer hood panel 703. For example, while the outer hood panel 703 is typically fabricated from metal (e.g., steel or aluminum), the inner panel (i.e., panel portions 705, 707, 709 and 711) is preferably fabricated from a composite or a plastic. The use of a composite or a plastic for the hood assembly's inner surface lowers vehicle weight.

In the illustrated and preferred embodiment, the inner hood assembly surface is offset from the outer hood panel 703, for example by a distance 713 in the illustrated embodiment. This configuration allows further displacement of the hood assembly during a collision since the inner surfaces may be configured to easily break or compress after the initial displacement provided by offset 603 is reached. Note that region 715 separating outer hood panel 703 from the inner hood assembly surfaces (i.e., panel portions 705, 707, 709 and 711) may be hollow or, as preferred, filled with a light-weight, compressible material (e.g., closed- or open-cell foam).

Figure 8:
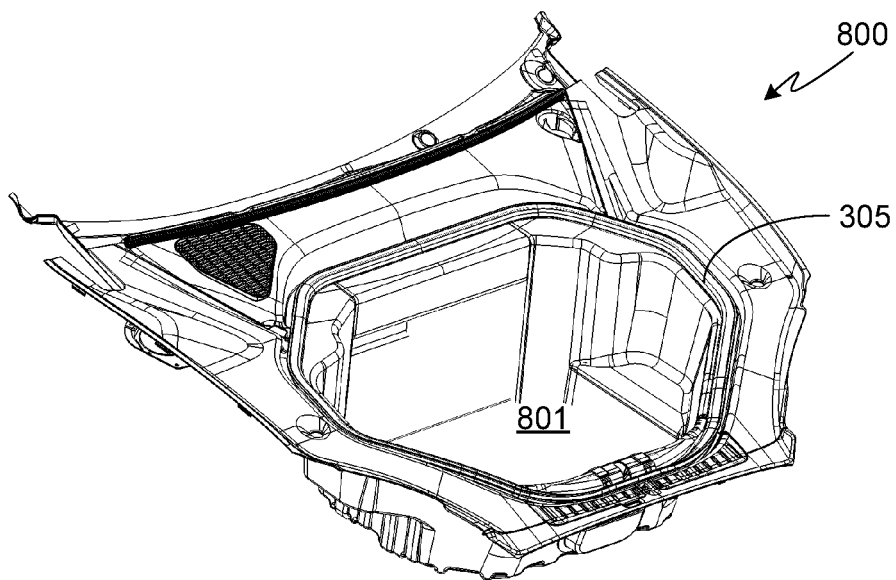
FIG. 8 provides a perspective view of a portion of a front vehicle assembly utilizing a seal in accordance with the invention.

FIG. 8 provides a perspective view of a portion of a front vehicle assembly 800 that utilizes a sealing member 305 as described in detail above. In this exemplary embodiment in which the hood is not shown for clarity, compartment 801 is a storage compartment. A front vehicle storage compartment, as shown, is typically only found in electric vehicles or internal combustion engine (ICE) vehicles utilizing a mid-engine or rear-engine configuration. It will be appreciated that the invention is equally applicable to front-engine ICE vehicles, assuming that the various engine components (e.g., air filter, valve cover(s), structural members, etc.) are spaced sufficiently below the hood to allow the hood to be depressed during a pedestrian/vehicle accident as described in detail above.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A seal assembly for a vehicle, comprising:
 a sealing flange, wherein said sealing flange is coupled to a vehicle structure;
 a sealing member attached to an end portion of said sealing flange; and
 a hood assembly, said hood assembly comprising an inner surface, said inner surface comprising a sealing surface, wherein said sealing surface of said hood assembly is configured to form a seal with said sealing member when said hood assembly is in a closed position, and wherein said sealing surface is sufficiently spaced apart from said end portion of said sealing flange to allow said sealing surface to pass said end portion of said sealing flange when a downward force is applied to an upper panel of said hood assembly causing said hood assembly to be downwardly displaced past said closed position.

2. The seal assembly of claim 1, wherein said sealing surface is spaced apart from said end portion of said sealing flange along a horizontal plane.

3. The seal assembly of claim 1, wherein said sealing member is partially compressed and deformed by said sealing surface when said hood assembly is in said closed position.

4. The seal assembly of claim 3, wherein said sealing member undergoes additional compression and deformation by said sealing surface when said sealing surface passes said end portion of said sealing flange due to said downward force being applied to said upper panel of said hood assembly.

5. The seal assembly of claim 1, wherein said end portion of said sealing flange is angled at an angle θ measured from a horizontal plane, and wherein said angle θ is in the range of 20 to 70 degrees.

6. The seal assembly of claim 1, wherein said end portion of said sealing flange is angled at an angle θ measured from a horizontal plane, and wherein said angle θ is in the range of 35 to 55 degrees.

7. The seal assembly of claim 1, wherein said end portion of said sealing flange is angled at an angle θ measured from a horizontal plane, and wherein said angle θ is set at approximately 45 degrees.

8. The seal assembly of claim 1, wherein said sealing member is fabricated from an elastomeric material selected from the group of elastomeric materials consisting of natural rubber and synthetic rubber.

9. The seal assembly of claim 8, wherein said synthetic rubber is selected from the group of synthetic rubbers consisting of nitrile, nitrile butadiene, carborylated nitrile, hydrogenated nitrile, perfluoroelastomer, silicone, silicone elastomer blends, thermoplastic elastomers, fluorosilicone, neoprene, ethylene propylene, polyurethane, butyl and ethylene propylene diene monomer.

10. The seal assembly of claim 1, said sealing member further comprising a slot configured to capture said end portion of said sealing flange.

11. The seal assembly of claim 10, said sealing member further comprising a plurality of pliable fingers extending from at least one inner slot surface corresponding to said slot of said sealing member, said plurality of pliable fingers configured to hold said sealing member in place on said end portion of said sealing flange.

12. The seal assembly of claim 11, wherein said plurality of pliable fingers are angled relative to said at least one inner slot surface.

13. The seal assembly of claim 10, further comprising an adhesive, said adhesive bonding at least one inner slot surface corresponding to said slot of said sealing member to said end portion of said sealing flange.

14. The seal assembly of claim 1, said sealing surface comprising a first portion, wherein said first portion is set at an angle of between 75 and 105 degrees as measured from said upper panel of said hood assembly.

15. The seal assembly of claim 1, wherein said inner surface of said hood assembly is fabricated from plastic, and wherein said upper panel of said hood assembly is fabricated from metal.

16. The seal assembly of claim 1, wherein said inner surface of said hood assembly is fabricated from a material selected from the group consisting of metals, plastics and composites.

17. The seal assembly of claim 1, wherein said inner surface of said hood assembly is spaced apart from said upper panel of said hood assembly.

18. The seal assembly of claim 17, said hood assembly further comprising a compressible material interposed between said inner surface of said hood assembly and said upper panel of said hood assembly.

19. The seal assembly of claim 18, wherein said compressible material consists of foam.

20. The seal assembly of claim 17, wherein a portion of said inner surface is recessed, said recessed portion located in a complementary position relative to said end portion of said sealing flange.

* * * * *